United States Patent Office 2,976,302
Patented Mar. 21, 1961

2,976,302
PROCESS FOR THE PRODUCTION OF 2,2-DIALKYL ANDROSTANE COMPOUNDS

Howard J. Ringold and George Rosenkranz, Mexico City, Mexico, assignors to Syntex S.A., Mexico City, Mexico, a corporation of Mexico No Drawing. Filed Mar. 11, 1957, Ser. No. 644,970

Claims priority, application Mexico Mar. 14, 1956

3 Claims. (Cl. 260—397.4)

The present invention relates to novel cyclopentanophenanthrene derivatives and to a process for the production thereof.

More particularly the present invention relates to novel androgenic hormones which are 2,2-dialkyl derivatives of testosterone, dihydrotestosterone, 17-lower alkyl testosterone and 17-lower alkyl dihydrotestosterone. The present invention also relates to active hormones of the androgen type which are the corresponding 3-hydroxy derivatives of the aforementioned compounds. The novel useful androgens of the present invention differ substantially from the corresponding compounds without a 2,2-dialkyl substituent especially in that they have a different or higher androgenic-anabolic ratio.

It has been discovered in accordance with the present invention that treatment of dihydrotestosterone (androstan-17β-ol-3-one) or 17-lower alkyl-dihydrotestosterone (17α-lower alkyl-androstan-17β-ol-3-one) with a lower alkyl iodide in the presence of a potassium t-alkoxide resulted in the production of the corresponding novel 2,2-di lower alkyl derivatives i.e. 2,2-di lower alkyl-androstan-17β-ol-3-one and 2,2,17α-tri-lower alkyl-androstan-17β-ol-3-one. Further in accordance with the present invention it has been discovered that monobromination, of the aforementioned compounds gave the corresponding 4-bromo-2,2-di lower alkyl or 2,2,17α-tri lower alkylandrostan-17β-ol-3-one compounds which on dehydrobromination gave the corresponding novel 2,2-di lower alkyl or 2,2,17α-tri lower alkyl Δ⁴-androsten-17β-ol-3-one compounds. All of these novel compounds upon treatment with a reducing agent gave the corresponding novel 3-hydroxy derivatives. By conventional esterification there was also prepared the esters of those compounds wherein the alcohol groups were non-tertiary.

The novel compounds of the present invention may therefore be indicated by the following formulas:

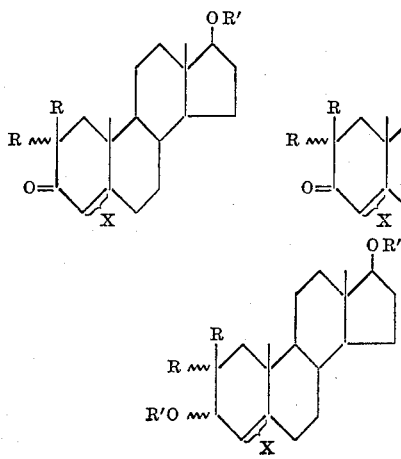

and

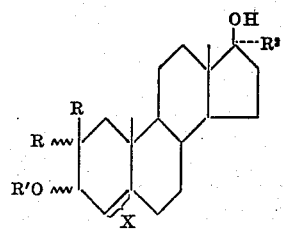

In the above formulas R represents an alkyl group preferably a lower alkyl group of less than 7 carbon atoms such as methyl, ethyl or propyl. R' represents hydrogen or an acyl group of the type conventionally found in an esterified steroid alcohols. These are generally those derived from a hydrocarbon carboxylic acid of less than 12 carbon atoms such as acetic, propionic, butyric, valeric, hexanoic, caprylic, hydrocinnamic cyclopentylpropionic, benzoic etc. R² represents a lower alkyl group of less than 7 carbon atoms such as methyl, ethyl or propyl. X represents a double bond between C–4 and C–5 or a saturated linkage between C–4 and C–5.

The novel compounds of the present invention may be prepared by a process illustrated in part by the following equations:

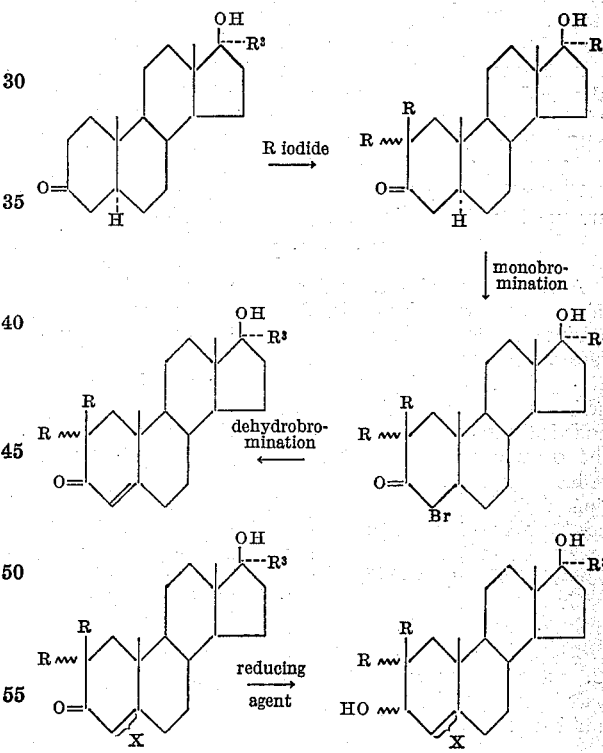

In the above equations R and X represents the same groups as heretofore. R³ represents either hydrogen or R² as previously defined.

Referring to the first equation above, the starting compound which may be, as illustrated, androstan-17β-ol-3-one or 17α-lower alkyl-androstan-17β-ol-3-one, in an organic solvent, such as t-butanol, is mixed with a potassium t-alkoxide, such as potassium t-butoxide, and the mixture stirred under nitrogen atmosphere for a short time such as half an hour. An excess of a lower alkyl iodide such as methyl, ethyl or propyl iodide is then added and the reaction mixture stirred for a longer period of time i.e.

of the order of 4 hours. Water is then added, the solution is neutralized with acid and the organic solvent is removed by reduced pressure distillation. The residue is then collected by filtration and purified to give the respective 2,2-di lower alkyl or 2,2,17α-tri lower alkyl-androstan-17β-ol-3-one. By conventional esterification procedures such as reaction with acetic anhydride or other acid anhydrides or chlorides of the type previously described there is then prepared the corresponding 17-acylates of hydrocarbon carboxylic acids of less than 12 carbon atoms of the 2,2-di lower alkyl compounds.

To prepare the corresponding Δ⁴-compounds the 2,2-di lower alkyl or the 2,2,17α-tri lower alkyl derivatives or the 17-esters of the 2,2-di lower alkyl derivatives are treated with slightly over 1 molar equivalent of bromine to prepare the corresponding 4-monobromo compounds. Dehydrobromination of the 4-bromo compounds as with a tertiary amine such as collidine gave the corresponding Δ⁴-compounds i.e. 2,2-di lower alkyl-Δ⁴-androsten-17β-ol-3-one and its 17-esters or 2,2,17α-tri lower alkyl Δ⁴-androsten-17β-ol-3-one.

As illustrated in the second equation treatment of the compounds just mentioned, the previously set forth 2,2-di lower alkyl or 2,2,17α-tri lower alkyl-saturated compounds with a reducing agent such as sodium borohydride gives 3-hydroxy derivatives. Thus from 2,2-di lower alkyl-androstan-17β-ol-3-one there is prepared the corresponding 2,2-di lower alkyl-3,17β-diol derivatives, from 2,2,17α-tri lower alkyl-androstan-17β-ol-3-one, the corresponding 2,2-17α-tri lower alkyl-androstan-3,17β-diol derivatives, from 2,2-di lower alkyl-Δ⁴-androsten-17β-ol, the corresponding 2,2-di lower alkyl-Δ⁴-androsten-3,17β-diol and from 2,2,17α-tri lower alkyl-Δ⁴-androsten-17β-ol-3-one, the corresponding 2,2,17α-tri lower alkyl-Δ⁴-androsten-3,17β-diol derivatives. By conventional esterification procedures the previously described esters of these compounds were prepared i.e. the 3,17-diesters of 2,2-di lower alkyl derivatives and the 3-monoesters of the 2,2,17α-tri lower alkyl derivatives.

The following specific examples serve to illustrate but are not intended to limit the present invention.

Example I

A suspension of 5 g. of dihydrotestosterone in 40 cc. of t-butanol was mixed with 3 molar equivalents of potassium t-butoxide in 60 cc. of t-butanol and the mixture was stirred under an atmosphere of nitrogen for 30 minutes. 6 molar equivalents of methyl iodide was added and stirred for 4 additional hours. Water was added, the solution was neutralized with acetic acid and the organic solvent was removed by distillation under reduced pressure. The residue was collected by filtration, dried and chromatographed in a column of ethyl acetate washed alumina, thus yielding 2.5 g. of 2,2-dimethyl-androstan-17β-ol-3-one having a melting point of 134–136° C. $[\alpha]_D$ +72°.

Upon conventional esterification with acetic anhydride there was prepared the 17-acetate of 2,2-dimethyl-androstan-17β-ol-3-one with a melting point of 138–140° C. In a similar conventional way there was also prepared the propionate, butyrate, cyclopentylpropionate and benzoate.

Example II 5 g. of 17-methyl-dihydrotestosterone was treated such as described in Example I to produce 2,2,17-trimethyl-androstan-17β-ol-3-one having a melting point of 117–120° C., $[\alpha]_D$ +53°.

Similarly, there were obtained the corresponding 17α-propyldihydrotestosterone respectively.

Example III

A solution of 1.1 molar equivalents of bromine in 5 cc. of chloroform was added dropwise and under continuous stirring to a solution of 1 g. of 2,2-dimethyl-androstan-17β-ol-3-one in 20 cc. of chloroform, and once the solution had decolorized it was washed with water, with dilute sodium bicarbonate solution and water, dried over sodium sulfate and evaporated to dryness under reduced pressure, thus producing 4-bromo-2,2-dimethyl-androstan-17β-ol-3-one.

This product was heated under reflux for 1 hour with 10 cc. of collidine. The cooled mixture was diluted with ethyl acetate, and filtered and the ethyl acetate solution was washed with dilute sulfuric acid and water, dried and evaporated to dryness. Chromatography of the residue afforded 500 mg. of 2,2-dimethyl-testosterone.

The 17-acetate of 2,2-dimethyl-androstan-17β-ol-3-one upon treatment with 1.1 molar equivalents of bromine gave the 17-acetate of 4-bromo-2,2-dimethyl-androstan-17β-ol-3-one having a melting point of 146–148° C., $[\alpha]_D$ +13°. Dehydrobromination of this compound with collidine gave the 17-acetate of 2,2-dimethyl-testosterone with a melting point of 171–173° C., $[\alpha]_D$ +44°. Similar treatment of the other esters described in Example I gave the corresponding esters of 2,2-dimethyl-testosterone.

1 g. of 2,2-dimethyl-testosterone, dissolved in 30 cc. of methanol, was treated with 200 mg. of sodium borohydride and the mixture was refluxed for 1 hour, cooled and treated dropwise with acetic acid to destroy the excess of hydride. The mixture was poured into water, extracted with methylene dichloride and evaporated to dryness leaving as a residue 2,2-dimethyl-Δ⁴-androsten-3,17β-diol.

Conventional esterification with acetic anhydride gave the 3,17-diacetate of 2,2-dimethyl-Δ⁴-androsten-3,17β-diol and in a similar way there was also prepared the dipropionate, dibutyrate and dibenzoate.

Example IV 1 g. of the 2,2-dimethyl-dihydrotestosterone, obtained in accordance with Example I, was treated by the procedure described in the last paragraph of Example III, thus giving 2,2-dimethyl-androstan-3,17β-diol.

By following the procedure of Example III from 2,2,17α-trimethyl-androstan-17β-ol-3-one there was obtained 2,2,17α-trimethyl-Δ⁴-androsten-17β-ol-3-one and from this compound there was obtained 2,2,17α-trimethyl-Δ⁴-androstan-3,17β-diol. Similarly from 2,2-dimethyl-17α-ethyl-androstan-17β-ol-3-one there was obtained 2,2 - dimethyl - 17α - ethyl-Δ⁴-androsten-17β-ol-3-one and from this last compound 2,2-dimethyl-17α-ethyl-Δ⁴-androsten-3-17β-diol. The 2,2-dimethyl-17α-propyl-Δ⁴-androsten-17β-ol-3-one and the 2,2-dimethyl-17α-propyl-Δ⁴-androsten-3,17β-diol derivatives were also prepared from 2,2-dimethyl-17α-propyl-androstan-17β-ol-3-one. By conventional esterification procedures there was prepared 3-monoesters of these trialkyl compounds as the 3-acetate, 3-propionate, 3-cyclopentylpropionate and 3-benzoate.

We claim:
1. A process for the production of compounds selected from the group consisting of 2,2-lower alkyl-Δ⁴-androsten-17β-ol-3-one and 2,2,17α-tri lower alkyl-Δ⁴-17β-ol-3-one comprising reacting respectively a compound selected from the group consisting of androstan-17β-ol-3-one and 17α-lower alkyl-androstan-17β-ol-3-one with an excess of a lower alkyl iodide in the presence of a potassium t-alkoxide to form a corresponding 2,2-di lower alkyl derivative, reacting the 2,2-di lower alkyl derivative with approximately 1 molar equivalent of bromine to form a corresponding 4-monobromo compound and refluxing the 4-monobromo compound with collidine.

2. The process of claim 1 wherein the alkyl iodide is methyl iodide and the final compound is a 2,2-dimethyl derivative.

3. The process of claim 1 wherein alkyl iodide is methyl iodide, the potassium t-alkoxide is potassium t-butoxide, the dehydrobrominating agent is collidine and the final product is a 2,2-dimethyl derivative.

(References on following page)

References Cited in the file of this patent

UNITED STATES PATENTS 2,852,537    Ringold et al. _____ Sept. 16, 1958

OTHER REFERENCES

Fieser et al.: Natural Products Related to Phenanthrene, 1949, pages 375–376.

"Therapie," Digonnet et al., vol. 9 (1954), pages 36–42 relied on or Chem. Abstracts, vol. 48, pars. 13975 (h).

Woods et al.: Jour. Chem. Society (1955), pages 3426–30 relied on.

Julia: Ann. Chem. (Paris), vol. 8, pages 410–49 relied on (1953).

Romo: Bol. Inst. Quim. Univ. Nacl. Auton., Mexico, vol. 4 (1952), pages 91–100 relied on.